(12) United States Patent
Kano

(10) Patent No.: US 8,905,557 B2
(45) Date of Patent: Dec. 9, 2014

(54) PROJECTION APPARATUS CAPABLE OF CHANGING PROJECTION LENS AND NON-TRANSITORY COMPUTER-READABLE STORAGE MEDIUM THAT STORES PROGRAM TO BE EXECUTED BY PROJECTION APPARATUS

(75) Inventor: Atsushi Kano, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 253 days.

(21) Appl. No.: 13/405,536

(22) Filed: Feb. 27, 2012

(65) Prior Publication Data

US 2012/0218528 A1 Aug. 30, 2012

(30) Foreign Application Priority Data

Feb. 28, 2011 (JP) ................................ 2011-041179
Dec. 13, 2011 (JP) ................................ 2011-272641

(51) Int. Cl.
G03B 21/14 (2006.01)
G02B 7/09 (2006.01)
G03B 21/54 (2006.01)

(52) U.S. Cl.
CPC ............ *G03B 21/142* (2013.01); *G03B 21/147* (2013.01); *G03B 21/54* (2013.01)
USPC .......................................... 353/101; 369/694

(58) Field of Classification Search
USPC .............. 353/69, 70, 100, 101, 121; 359/349, 359/672, 676, 694, 813
See application file for complete search history.

(56) References Cited

U.S. PATENT DOCUMENTS

| | | | |
|---|---|---|---|
| 6,592,228 B1 * | 7/2003 | Kawashima et al. ......... | 353/101 |
| 8,007,116 B2 * | 8/2011 | Matsuda et al. .............. | 353/101 |
| 8,287,140 B2 * | 10/2012 | Fujimaki ....................... | 353/100 |
| 2011/0292351 A1 * | 12/2011 | Ishii .............................. | 353/69 |
| 2012/0147341 A1 * | 6/2012 | Tsukagoshi ................... | 353/101 |
| 2012/0218527 A1 * | 8/2012 | Hatakeyama et al. ........ | 353/101 |

FOREIGN PATENT DOCUMENTS

| | | | |
|---|---|---|---|
| JP | 2001-145047 | * | 8/2001 |
| JP | 2001-215610 A | | 8/2001 |

* cited by examiner

*Primary Examiner* — William C Dowling
(74) *Attorney, Agent, or Firm* — Rossi, Kimms & McDowell LLP

(57) ABSTRACT

A projection apparatus is capable of changing a lens, and includes a lens shift unit that moves a mounted lens to a reference position in accordance with the mounted lens when the lens is changed.

17 Claims, 10 Drawing Sheets

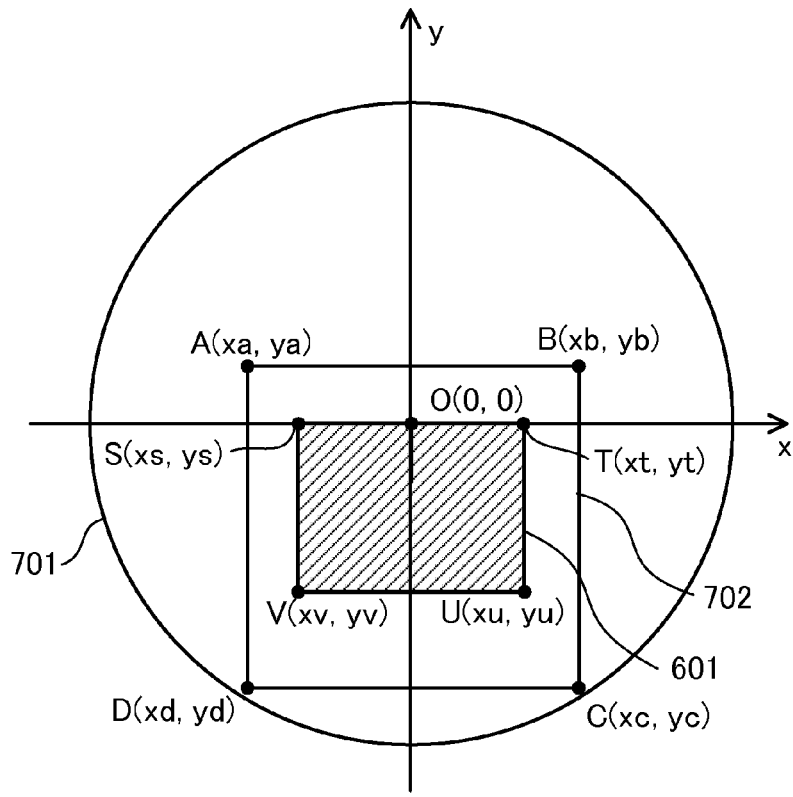
FIG. 8
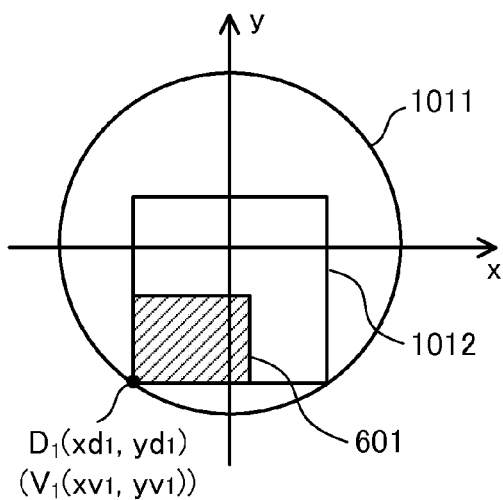
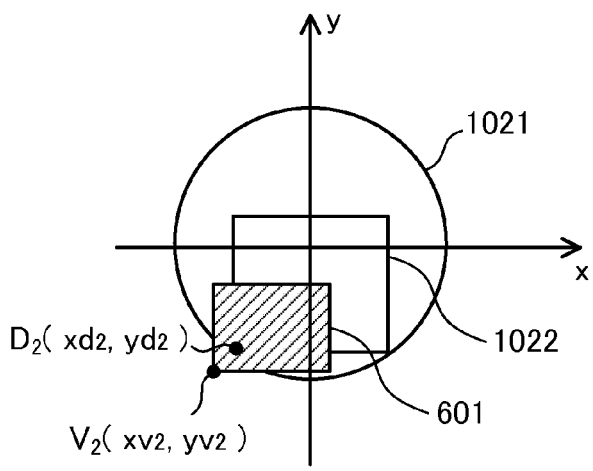
FIG. 9A  FIG. 9B

PROJECTION APPARATUS CAPABLE OF CHANGING PROJECTION LENS AND NON-TRANSITORY COMPUTER-READABLE STORAGE MEDIUM THAT STORES PROGRAM TO BE EXECUTED BY PROJECTION APPARATUS

BACKGROUND OF THE INVENTION

1. Field of the Invention

The present invention relates to a projection apparatus capable of changing a projection lens.

2. Description of the Related Art

Conventionally, there is a projection apparatus that is capable of changing a projection lens (hereinafter, referred to as a lens). However, an appropriate projection setting in accordance with characteristics of the lens is not considered. Therefore, the readjustment in accordance with the characteristics of the lens after changing the lens, particularly the setting related to a lens shift amount is left to a user. For example, Japanese Patent Laid-Open No. 2001-215610 discloses a method of detecting whether or not a shift amount between an image axis that is a center of an image and a lens optical axis that is a center of the lens is over a certain value using a distance sensor.

However, in the detection method disclosed in Japanese Patent Laid-Open No. 2001-215610, there is a possibility that projection light after changing the lens does not normally enter the lens even when a position of the lens is in a normal range before changing the lens. As a result, there is a case where an image is not formed on a screen and any screen message is not displayed. Therefore, a reference position needs to be set for each lens so that an appropriate projection is possible.

SUMMARY OF THE INVENTION

The present invention provides a projection apparatus that moves a lens to a reference position in accordance with a type of the lens when the lens is changed.

A projection apparatus as one aspect of the present invention is a projection apparatus capable of changing a lens, and includes a lens shift unit configured to move a mounted lens to a reference position in accordance with the mounted lens when the lens is changed.

A non-transitory computer-readable storage medium as another aspect of the present invention stores a program configured to be executed by a projection apparatus capable of changing a lens, the program includes a lens shift step of moving a mounted lens to a reference position in accordance with the mounted lens when the lens is changed.

Further features and aspects of the present invention will become apparent from the following description of exemplary embodiments with reference to the attached drawings.

BRIEF DESCRIPTION OF THE DRAWINGS

FIG. 8 is a schematic diagram of illustrating a movable range of the lens apparatus in Embodiment 1.

FIGS. 9A and 9B are schematic diagrams of illustrating an inappropriate state of the lens apparatus that is to be caused by a lens shift in Embodiment 1.

DESCRIPTION OF THE PREFERRED EMBODIMENTS

Figure 1:
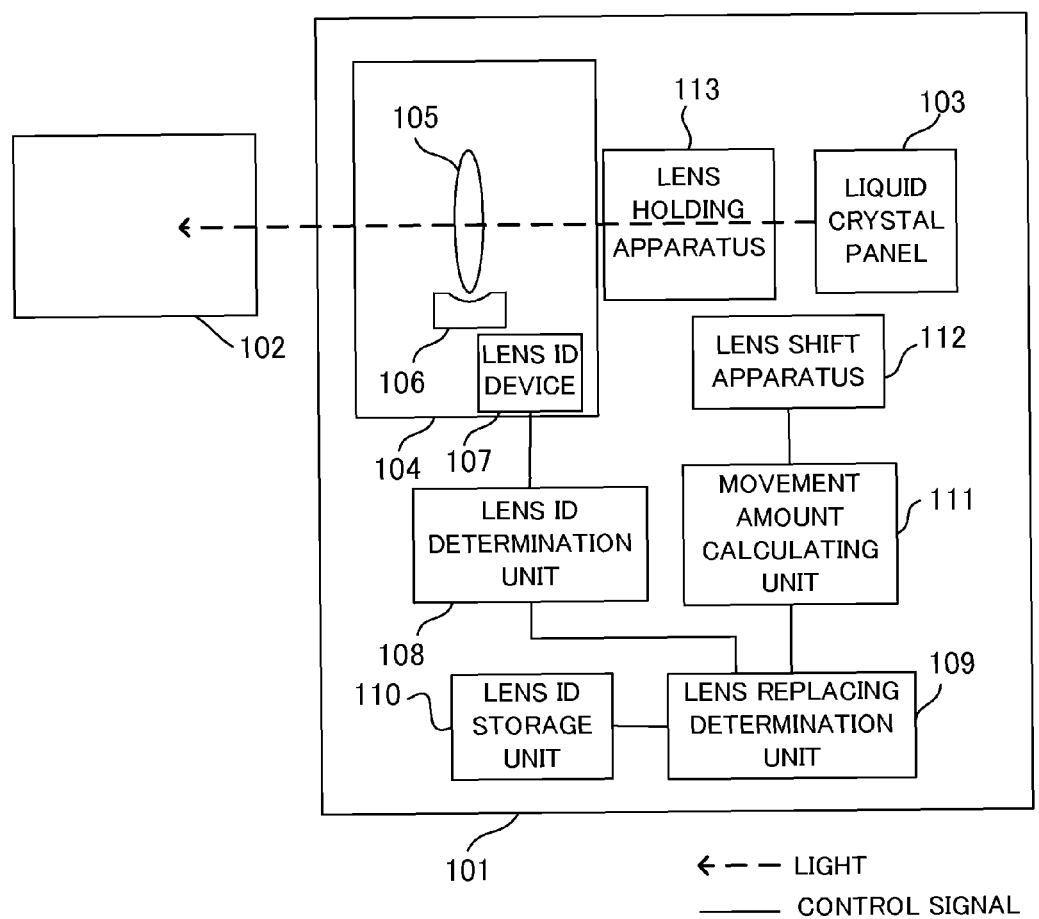
FIG. 1 is a configuration diagram of a main part of a projection apparatus in Embodiment 1.

Exemplary embodiments of the present invention will be described below with reference to the accompanied drawings. In each of the drawings, the same elements will be denoted by the same reference numerals and the duplicate descriptions thereof will be omitted.

Figure 2:
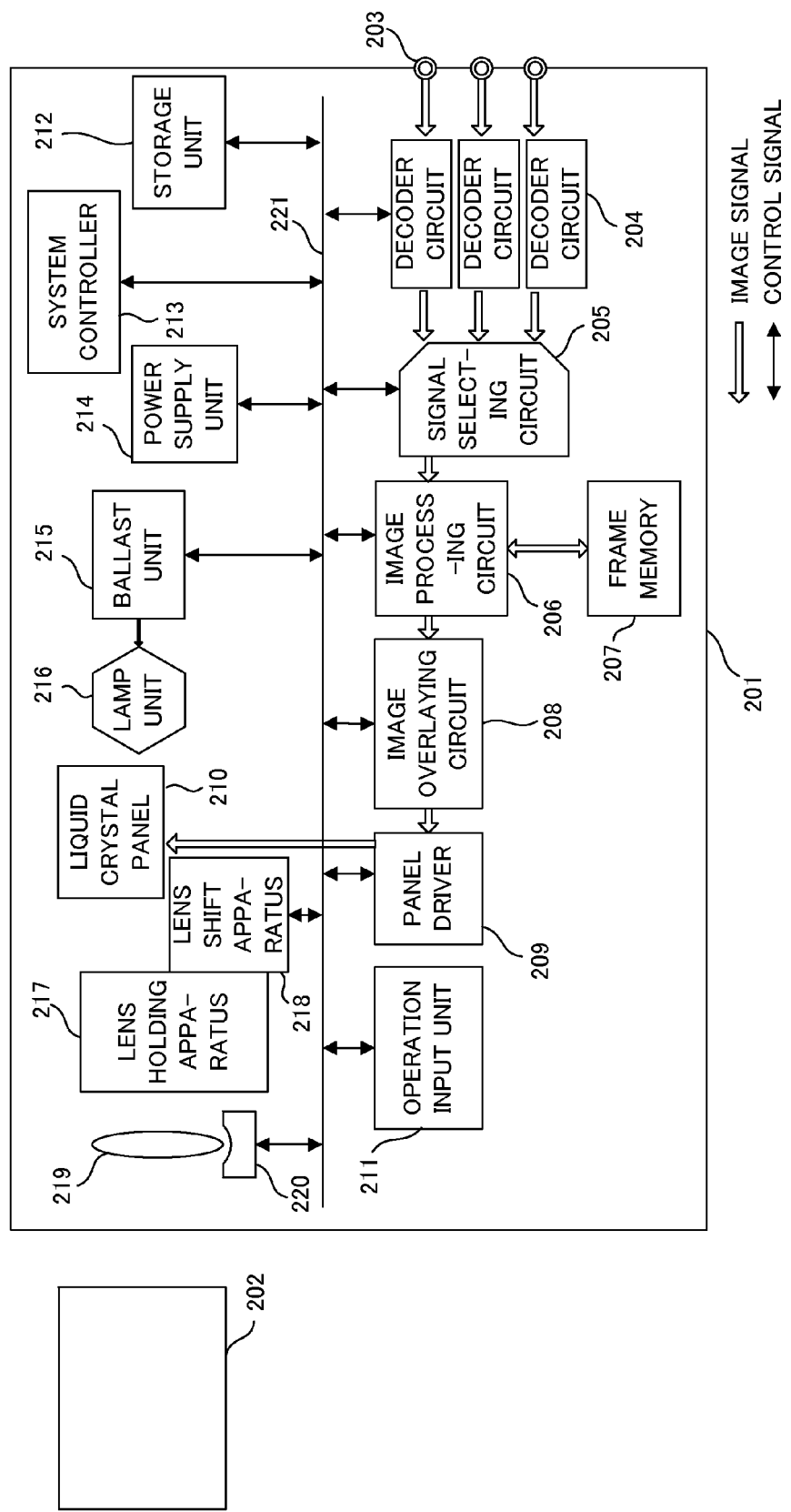
FIG. 2 is a schematic configuration diagram of a projection apparatus in the embodiments.

First of all, referring to FIG. 2, an entire configuration of a projection apparatus in the embodiment of the present invention will be described. FIG. 2 is a schematic configuration diagram of the projection apparatus in the present embodiment. Reference numeral 201 denotes a projection apparatus that is capable of changing a lens, and reference numeral 202 denotes a projection plane such as a screen. Reference numeral 203 denotes a connector terminal that inputs an image signal to the projection apparatus 201, which is for example a pin plug terminal, a D-Sub terminal, an HDMI terminal, or a DVI terminal. The image signal such as a video signal, a component signal, an analog RGB signal, an HDMI signal, or a digital RGB signal is inputted to the connector terminal 203. A decoder circuit 204 performs a signal processing such as a synchronizing separation or an analog-to-digital conversion (A/D conversion) that is required for each of kinds of signals for a plurality of image signals inputted from the connector terminal 203. Reference numeral 205 denotes a signal selecting circuit, which selects an image signal to be projected.

The image signal selected by the signal selecting circuit 205 is inputted to an image processing circuit 206. The image processing circuit 206 performs various kinds of image processings such as an interlaced/progressive conversion, a frame rate conversion, a resolution conversion, an aspect conversion, or a color correction, for the inputted image signal. In this time, the image processing circuit 206 uses a frame memory 207 as a work region if necessary. An image overlaying circuit 208 overlays an on-screen display (OSD) onto an image signal for which the image processing has been performed by the image processing circuit 206. The OSD display means a display such as a menu, a pointer, or a message, and the image overlaying circuit 208 superimposes the OSD display on the image signal.

Reference numeral 209 denotes a panel driver, which provides a timing signal and an image signal to a liquid crystal panel (an optical modulation element, or an image display element) 210 to drive the liquid crystal panel 210. The liquid crystal panel converts an electric image signal for each color component of for example R, G, and B into a two-dimensional image. As the liquid crystal panel 210, a transmissive or reflective liquid crystal, a mirror device, or the like is used.

Reference numeral 216 denotes a lamp unit, which is a light source for the liquid crystal panel 210. Reference numeral 219 denotes a lens unit, which is held by a lens holding apparatus 217. Reference numeral 220 denotes a focus/zoom adjustment apparatus, which moves the lens unit 219 in an optical axis direction. Reference numeral 218 denotes a lens shift apparatus (a lens shift unit), which moves the lens unit 219 so that the image can be movable up, down, right, or left. A focusing or a zoom adjustment is performed by the lens unit 219 for the image formed on the liquid crystal panel 210 to be projected onto the screen 202. Reference numeral 215 denotes a ballast unit that supplies an electric power to the lamp unit 216 while controlling a voltage. Reference numeral 214 denotes a power supply unit that generates an electric power that is a source of the electric power supplied by the ballast unit 215 and that supplies the electric power to the projection apparatus 201.

The projection apparatus 201 is provided with an operation input unit 211 that receives an operation input by a user. The operation input unit 211 is capable of controlling the projection apparatus 201 by a key device provided on the body of the projection apparatus 201 or a key operation with a remote control (not shown) or a command operation from a remote control (not shown).

Each component described above is controlled by a control signal or data from a system controller 213. The system controller 213 is a processor unit capable of a program control, which is provided with a CPU (a processor), a RAM, a ROM, and the like, and the system controller 213 is coupled to each component via an internal line 221 provided with a system bus or an I/O device. The system controller 213 also obtains information from each component and controls each component. Reference numeral 212 denotes a storage unit that stores various kinds of information such as an internal state, a usage history, or an adjustment parameter of the projection apparatus 201.

Embodiment 1

Next, a projection apparatus in Embodiment 1 of the present invention will be described. FIG. 1 is a configuration diagram of a main part of the projection apparatus in the present embodiment. In FIG. 1, reference numeral 101 denotes a projection apparatus capable of changing a lens, reference numeral 102 denotes a projection plane such as a screen. The projection image or the projection video is formed by an electric-optical modulation apparatus of the liquid crystal panel 103. A focusing and a zooming operation are performed by the lens apparatus 104 for the formed image. The lens apparatus 104 includes one or more lens units 105, and is capable of performing an optical focus adjustment and a magnification-varying adjustment. A focus/zoom adjustment apparatus 106 can move a necessary lens of the lens unit 105.

The lens apparatus 104 is connected to the projection apparatus 101 by the lens holding apparatus 113. A lens shift apparatus 112 moves the lens holding apparatus 113 in order to move the image on the projection plane 102 up, down, right, or left. In other words, the lens holding apparatus 113 moves the lens apparatus 104 up, down, right, or left so that the image is movable up, down, right, or left. However, the movement of the projection image to the up, down, right, or left may be performed by a method of moving a part of lenses used for the shift, provided in the lens apparatus 104, as well as a method of moving whole of the lens apparatus 104. Alternatively, a method of moving a member at an upstream optical path side that is configured by the liquid crystal panel 103 and an optical path unit (not shown) can also be used.

Figure 3:
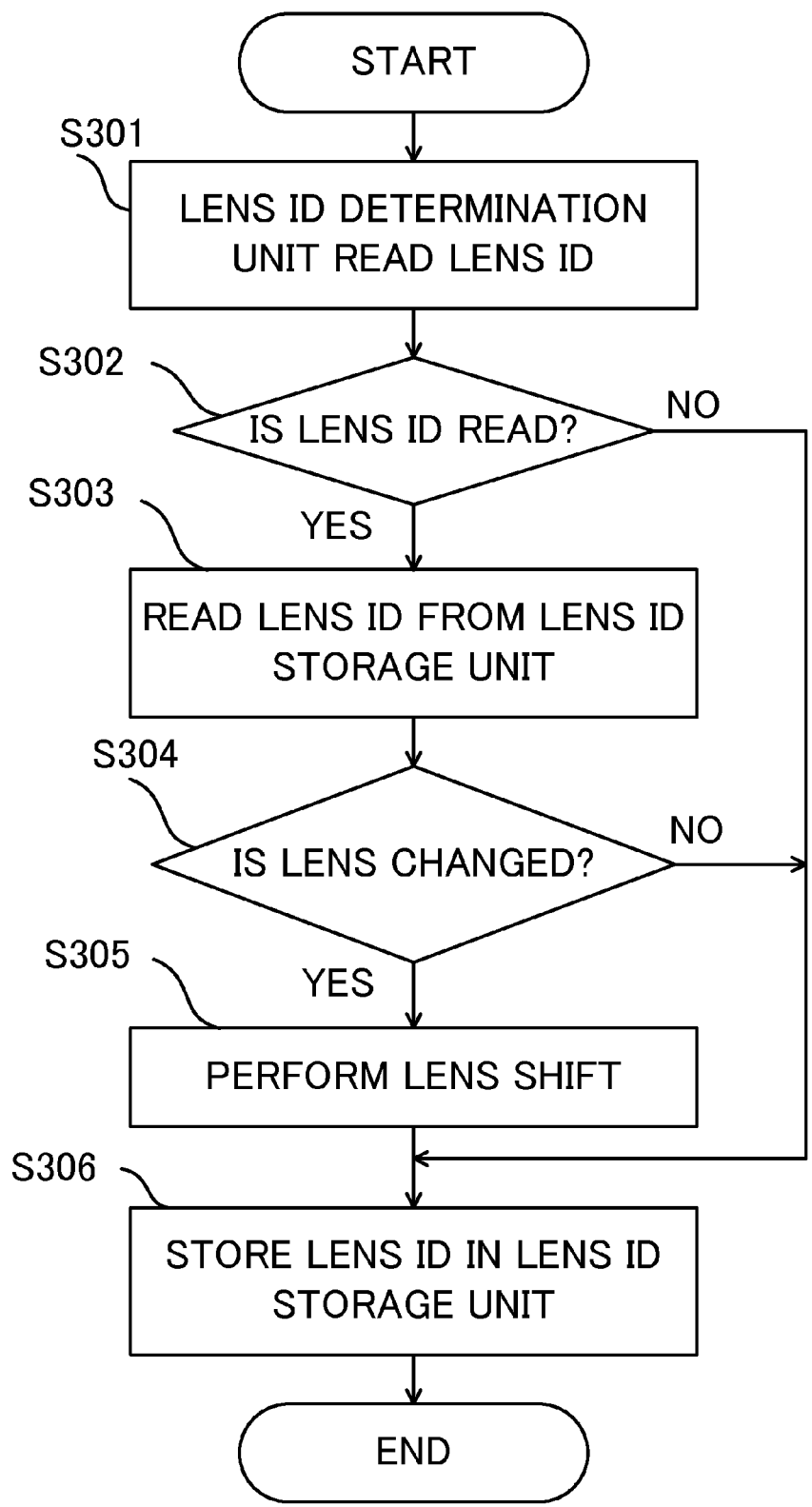
FIG. 3 is a flow chart of illustrating a processing procedure at the time of changing a lens in Embodiment 1.

Subsequently, referring to FIG. 3, a processing procedure at the time of changing the lens (the lens apparatus 104) will be described. This processing procedure is stored for example in a storage medium or a storage unit inside the projection apparatus as a program that is executed by the projection apparatus capable of changing the lens. FIG. 3 is a flowchart of illustrating the processing procedure at the time of changing the lens in the present embodiment. In FIG. 3, fist of all, in Step S301, a lens ID determination unit 108 (a lens information determination unit) reads a lens ID (lens information) from a lens ID device 107. Thus, the lens ID determination unit 108 determines the lens information of the mounted lens. As the lens ID, any configuration can be adopted as long as it has a mechanism that is capable of determining the type of the lens (the lens apparatus 104). For example, the lens ID may be identification by using an electric short, or it may be read from the ROM that is provided in the lens apparatus 104. The lens information (the lens ID) means a type, a name, a part number, or the like of the lens, but the present embodiment is not limited to this. The lens information may be a mark or a code that can specify the lens, other than the information described above, and it may also be information related to the performance such as a focal length, an F-number, or a range in which the lens can be shifted.

Figure 4A:
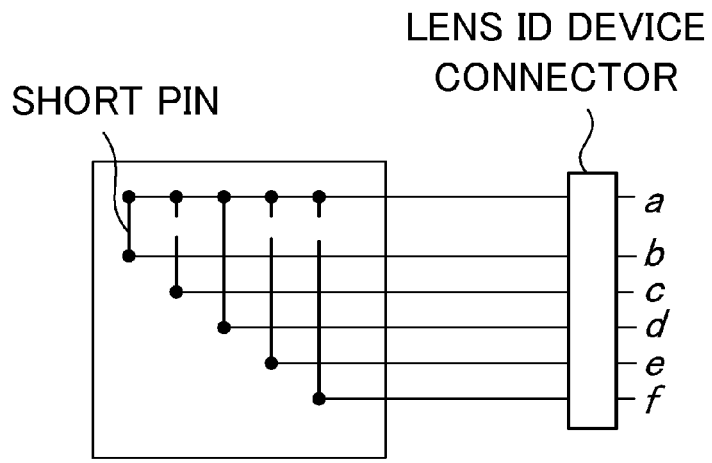
FIGS. 4A and 4B are schematic diagrams of a lens ID device in Embodiment 1.
Figure 4B:
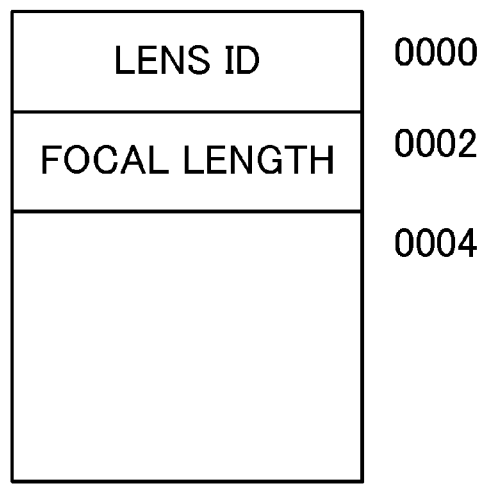

FIGS. 4A and 4B are schematic diagrams as one example of the lens ID device 107 in the present embodiment, and FIG. 4A is a specific example of the electric short. As illustrated in FIG. 4A, there are five short pins in the lens ID device 107, and the lens ID determination unit 108 can read the short state of the lens ID device 107 to determine the type of the lens apparatus 104. In FIG. 4A, terminals "a" and "b", and terminals "a" and "d" of a lens ID device connector are electrically shorted, respectively. When a short state is denoted by "ON" and an open state is denoted by "OFF", the states of the terminals b, c, d, e, and f are ON, OFF, ON, OFF, and OFF, respectively. The combination of ON and OFF is different in accordance with the type of the lens apparatus 104, and therefore the type of the lens apparatus 104 can be determined.

FIG. 4B is a schematic diagram as another example of the lens ID device 107, which illustrates the lens ID device 107 that is configured by including a ROM (a storage unit). In the ROM of the lens ID device 107, a lens ID (0000) and a focal length (0002) are stored in a predetermined address. The lens ID determination unit 108 can read the lens ID stored in the ROM that is provided in the mounted lens apparatus 104 to determine the type of the lens apparatus 104. In order to operate the ROM, the lens ID determination unit 108 includes a connector or an electric contact for the lens ID device 107, which has a circuit configuration capable of supplying an electric power and a performing a bus connection.

Next, in Step S302, the lens ID determination unit 108 determines whether or not the lens ID has been read. When the lens ID has not been read, the flow proceeds to Step S306. On the other hand, when the lens ID has been read, the flow proceeds to Step S303. In Step S303, a lens replacing determination unit 109 reads a previously stored lens ID (a lens ID of a previously mounted apparatus 104, or a lens ID of a lens apparatus 104 before the change) from a lens ID storage unit 110 (a lens information storage unit). The lens ID storage unit 110 stores the lens ID (the lens information) before changing the lens, including a case where the lens is not mounted.

Subsequently, in Step S304, the lens replacing determination unit 109 (a comparison unit) compares the lens ID read from the lens apparatus 104 with the lens ID read from the lens ID storage unit 110 to determine whether the lens has been changed. As a result of the comparison, the lens replacing determination unit 109 determines that the lens has not been changed when the lens ID is identical, and the lens shift apparatus 112 does not move the lens apparatus 104 to proceed to Step S306 and the lens ID read from the lens apparatus 104 is stored. In this case, since the lens ID is identical, no new storage operation is performed. On the other hand, when the lens ID is different as a result of the comparison, the lens replacing determination unit 109 determines that the les apparatus 104 has been changed and the flow proceeds to Step S305. Thus, the lens replacing determination unit 109 compares the lens ID stored in the lens ID storage unit 110 with the lens ID of the mounted lens determined by the lens ID determination unit 108. When the lens ID of the mounted lens determined by the lens ID determination unit 108 is different from the lens ID stored in the lens ID storage unit 110, the lens replacing determination unit 109 determines that the lens has been changed.

In Step S305, the lens shift apparatus 112 moves the lens apparatus 104 (a lens unit 105) in an appropriate direction (up, down, right, and left) in accordance with the type of the lens apparatus 104. In this time, the lens shift apparatus 112 moves the lens apparatus 104 (the lens unit 105) by a movement amount required for the movement to a reference position set by a movement amount calculating unit 111. Thus, when the lens is changed, the lens shift apparatus 112 moves the mounted lens (the changed lens) to the reference position in accordance with the mounted lens.

Figure 5:
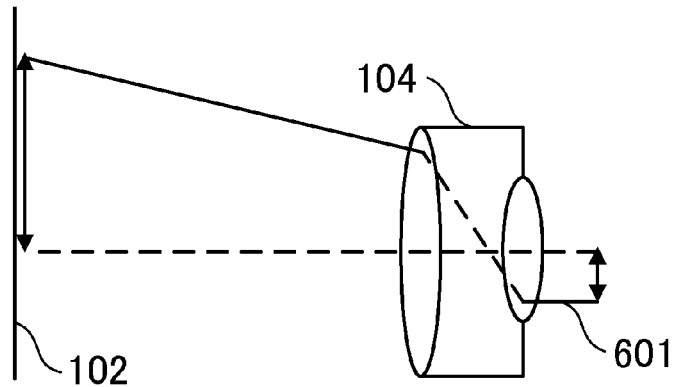
FIG. 5 is a schematic diagram of illustrating an optical path of a lens apparatus in Embodiment 1.

Hereinafter, the reference position and the movement amount (a lens moving mount) that are set by the movement amount calculating unit 111 will be described. First of all, a concept of an original movement amount of the lens shift apparatus 112 is described. FIG. 5 is a schematic diagram of illustrating an optical path of the lens apparatus in the present embodiment. As illustrated in FIG. 5, image light 601 formed by the liquid crystal panel 103 (FIG. 1) enters the lens apparatus 104 to form an image on the projection plane 102. In this time, there is a region in which the image light 601 entering the lens apparatus 104 passes through the lens apparatus 104 appropriately in terms of a light fall-off, a color separation, a distortion, a field curvature, and the like, i.e. a region called an image circle. The limitation of the movement amount of the lens shift is a movement amount where the image light 601 can pass the inside of this image circle without failure, or without being blocked.

Figure 6:
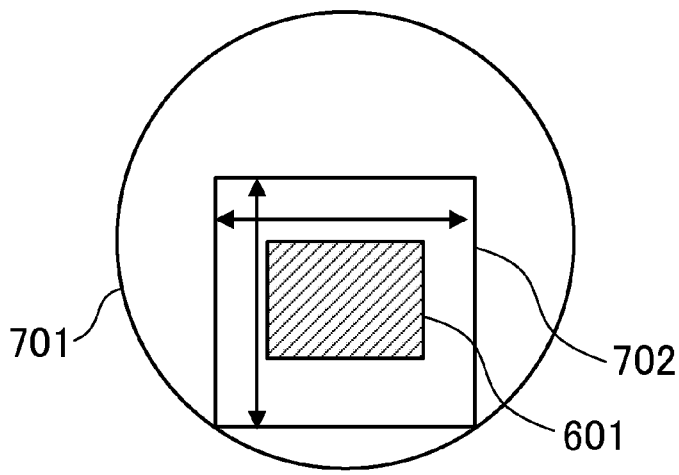
FIG. 6 is a schematic diagram of illustrating an image circle of the lens apparatus in Embodiment 1.

FIG. 6 is a schematic diagram of illustrating the image circle of the lens apparatus in the present embodiment, which represents a concept of the image circle from a view point on an optical axis. In FIG. 6, reference numeral 701 denotes an image circle, reference numeral 702 denotes a region that the image light 601 (a shaded area) passes, which is an inside of the image circle 701. The region 702 is a range in which the image light 601 is movable. The region 702 is originally designed so that the image light 601 is not protruded from the image circle 701. As illustrated in FIG. 6, the region 702 is generally limited to a predetermined area. A range indicated by an arrow in FIG. 6 (the region 702) is a movable range of the lens shift apparatus 112. The lens apparatus 104 actually moves in the present embodiment, but for convenience, the embodiment is represented so that the image light 601 moves.

Figure 7A:
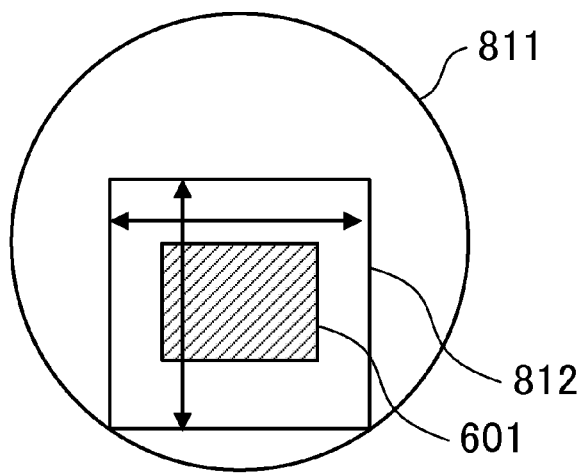
FIGS. 7A and 7B are schematic diagrams of illustrating a difference of the image circle in accordance with the lens apparatus in Embodiment 1.
Figure 7B:
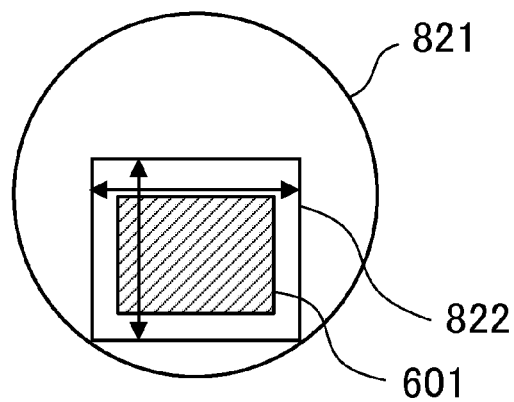

Next, the change of the movable range (the region 702) when the lens apparatus 104 is changed will be described. FIGS. 7A and 7B are schematic diagrams of illustrating the difference of the image circle in accordance with the type of the lens apparatus, and the image circles for two types of lenses are represented in FIGS. 7A and 7B. Reference numeral 811 in FIG. 7A denotes an image circle of a first lens apparatus, and reference numeral 821 in FIG. 7B denotes an image circle of a second lens apparatus. In both the first lens apparatus and the second lens apparatus, image lights 601 that pass inside the apparatus has the same size. However, since the image circles in the first lens apparatus and the second lens apparatus are different from each other, the difference of the movable ranges of the image light 601 is generated. Reference numeral 812 denotes a region as a movable range of the first lens apparatus. Reference numeral 822 denotes a movable range of the second lens apparatus. As illustrated in FIGS. 7A and 7B, when the lens apparatus 104 is changed, the difference of the movable range is generated since the image circle is different in accordance with optical characteristics.

Specifically, the movable range (the region 702) can be calculated as illustrated in FIG. 8. FIG. 8 is a schematic diagram of illustrating the movable range of the lens apparatus. In FIG. 8, the movable range is set to have a rectangle shape with respect to an optical axis center O(0,0) of the lens apparatus, and four edge points of the movable range are set to be A(xa,ya), B(xb,yb), C(xc,yc), and D(xd,yd). Each of the points A, B, C, and D has a different value in accordance with the lens apparatus, and the value can be specified by determining the type of the lens apparatus 104 by the lens ID device 107. For example, the movement amount calculating unit 111 can previously store the points A, B, C, and D in accordance with the type of the lens apparatus 104, i.e. the points A, B, C, and D suitable for the lens apparatus 104. When the lens ID device 107 is configured by a ROM, the points can also be stored as data in this ROM. The position and the size of the image light 601 are values that are fixed for each projection apparatus 101, which can be stored by the movement amount calculating unit 111. As illustrated in FIG. 8, the position and the size of the image light 601 are represented by points S(xs, ys), T(xt,yt), U(xu,yu), and V(xv,xy).

Next, an inconvenience that is generated by changing the lens will be described. FIGS. 9A and 9B are schematic diagrams of illustrating an inappropriate state of the lens apparatus that can be caused by the lens shift, which describe the protrusion of the image light 601 from the image circle by changing the lens. As illustrated in FIG. 9A, the image light 601 moves inside a region 1012 that is a movable range for an image circle 1011 of the first lens apparatus. In this state, when the first lens apparatus is replaced with the second lens apparatus having a second image circle 1021, there is a case in which the image light 601 is protruded from the image circle 1021 (FIG. 9B). If the projection is performed in this state, the image light 601 does not normally reach the projection plane 102, non-projection, abnormal decrease or decline of peripheral light amount, generation of extreme chromatic aberration, extreme peripheral curvature, or the like may be caused.

In this case, in order that the image light 601 is contained in the region 1022 that is the movable range, the reference position needs to be defined so that the point V2 is overlapped with the point D2 to be moved. This is represented as a calculation expression using marks in FIG. 8, i.e. xa is substituted into xs when xs<xa is met, xb is substituted into xt when xt>xb is met, yb is substituted into yt when yt>yb is met, and yc is substituted into yu when yu<yc is met.

A predetermined reference position may also be previously set so as to be moved to the reference position. For example, it is possible that the position where a lens shift amount is zero is set to be the reference position. The calculation expression in this case is a position where yt=0 and |xt|=|xs| are met in the setting called vertical shift of 50% and horizontal shift of 0%. It is a position where |yt|=|yu| and |xt|=|xs| are met in the setting called vertical and horizontal shift of 0%.

Figure 10A:
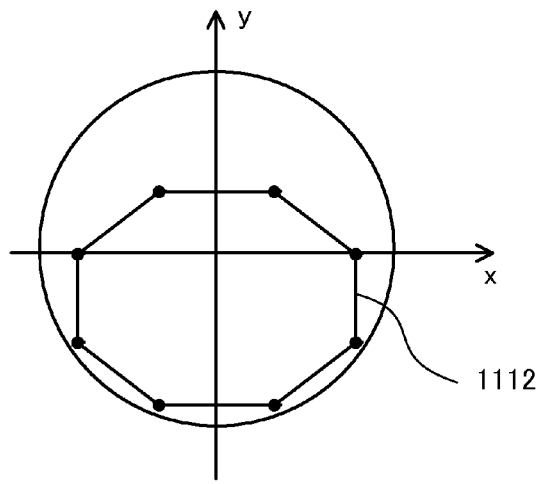
FIGS. 10A and 10B are schematic diagrams of illustrating the movable range of the lens apparatus in Embodiment 1.
Figure 10B:
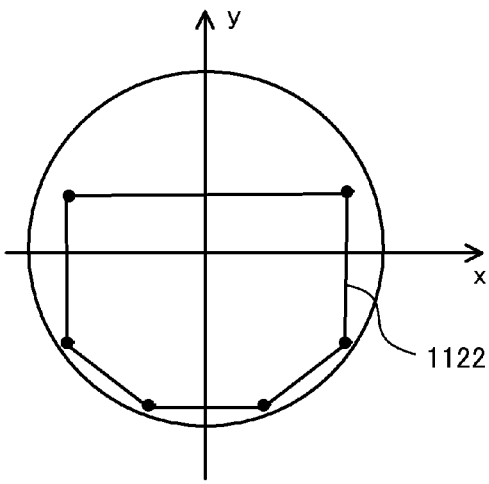

As described above, the movement amount calculating unit 111 sets the reference position to include the image light 601 in the region 702 that is the movable range to calculate the movement amount. In the present embodiment, the region 702 that is the movable range is set to have a rectangle shape, but as illustrated in FIGS. 10A and 10B, other shapes such as a octagon shape (a region 1112 in FIG. 10A), a hexagonal shape (a region 1122 in FIG. 10B), a circle, or another shape may also be set. When the image light is protruded from the image circle of the changed lens, the lens shift apparatus 112 moves the lens by the movement amount calculated by the movement amount calculating unit 111. In other words, the lens shift apparatus 112 moves the lens to the reference position so that an optical axis of the lens comes close to a normal that passes through a center of the liquid crystal panel 103.

Figure 14A:
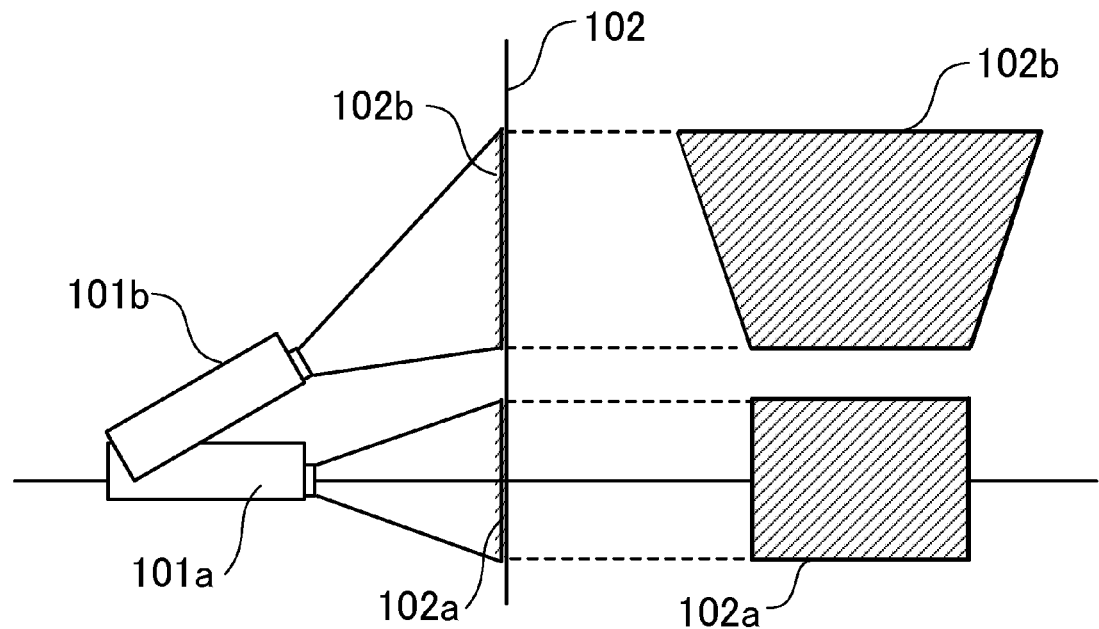
FIGS. 14A and 14B are diagrams of describing a case in which the projection apparatus is tilted with respect to a projection plane in Embodiment 1.
Figure 14B:
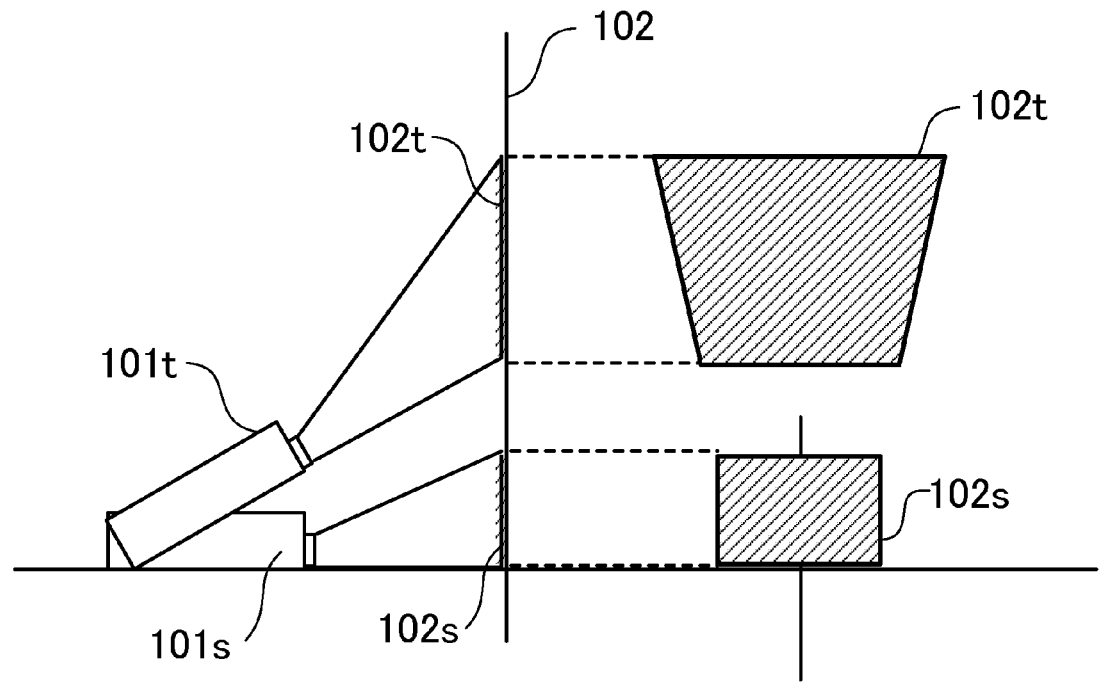

When a projection optical axis of the lens apparatus 104 is not vertical with respect to the projection plane 102, the projection image on the projection plane 102 becomes a distorted rectangle. FIGS. 14A and 14B are diagrams of describing a case in which the projection apparatus is tilted with respect to the projection plane, and FIG. 14A illustrates one example of a distortion of a image region when a projection apparatus 101a in which a center of the liquid crystal panel coincides with a lens optical axis is tilted in an upward direction. As illustrated in FIG. 14A, in the projection apparatus 101b that is tilted in the upward direction, an image region 102a on the projection plane 102 is deformed to be an image region 102b. FIG. 14B illustrates one example of the distortion of the image region when a projection apparatus 101s in which the center of the liquid crystal panel is displaced by a half height from the lens optical axis is tilted in the upward direction (a projection apparatus 101t). As illustrated in FIG. 14B, an image region 102s on the projection plane 102 is deformed to be an image region 102t. A method of electrically correcting this shape is called a Keystone correction or a trapezoidal correction. Such a correction is performed by an image processing circuit 206 in the projection apparatus 201 illustrated in FIG. 2. An amount of Keystone correction (an amount of trapezoidal correction) can be obtained by a geometric calculation based on a position relation between the lens unit 219 and the image light passing through the lens unit 219 (a displacement of the optical axis of the lens and the center of the liquid crystal panel, and a projection field angle) and a tilt angle.

Figure 15A:
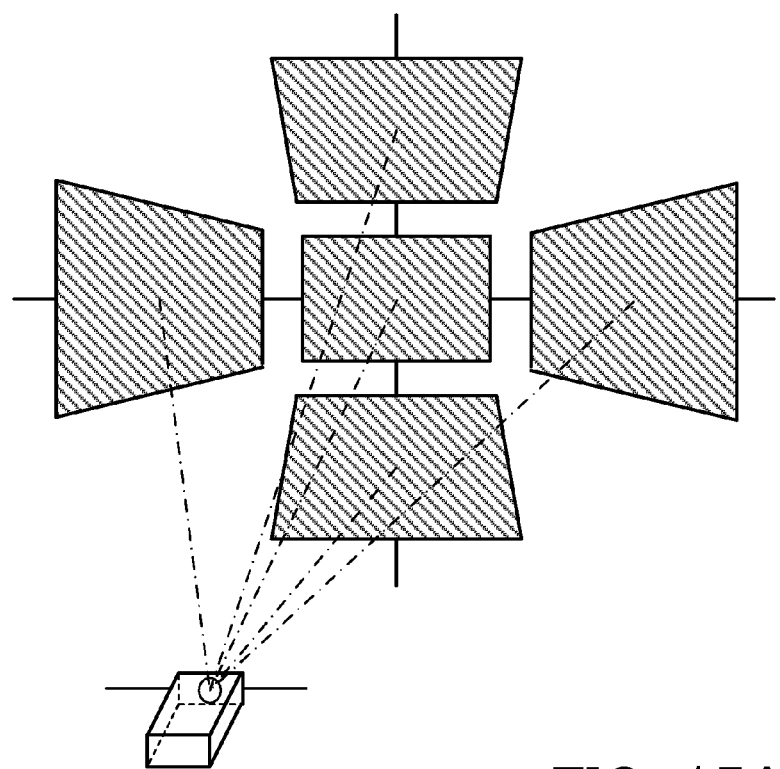
FIGS. 15A and 15B are schematic diagrams of a deformed shape in the case in which the projection apparatus is tilted with respect to the projection plane in Embodiment 1.
Figure 15B:
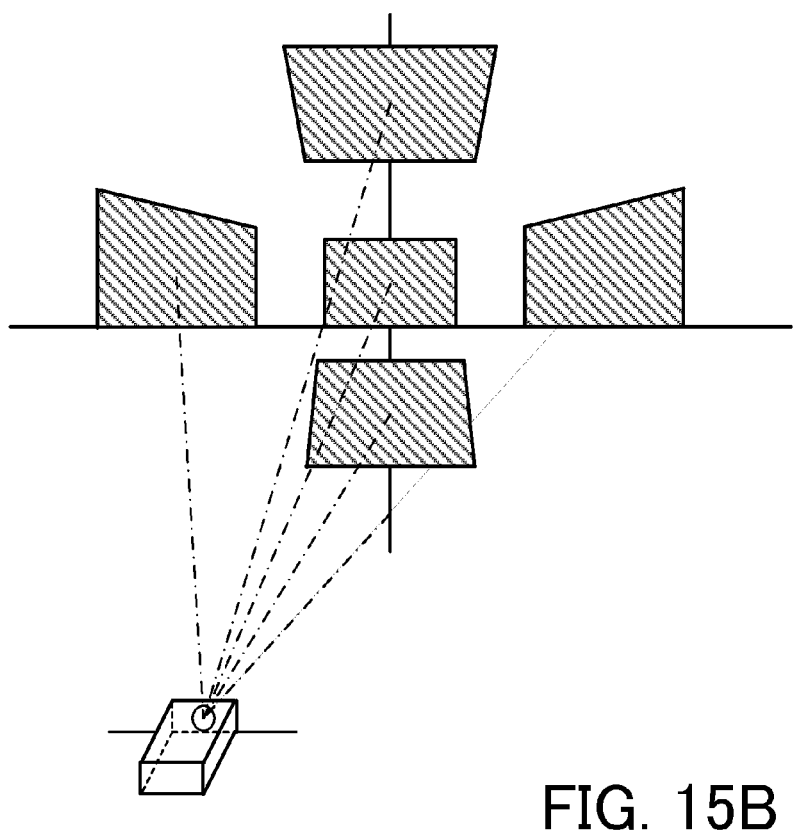

However, in order to reduce the calculation time, there is a case in which a simplified calculation using a parameter table is performed. For example, a lens shift position that is used most frequently for each lens is assumed. When the lens is assumed to be frequently used on a desk, the lens shift position is set to 50% (substantially a half of the screen). When the lens is assumed to be frequently used in a back projection, the lens shift position is set to 0% (the corrections of the optical axis of the lens and the center of the liquid crystal panel are substantially the same). FIGS. 15A and 15B are schematic diagrams of deformed shapes in this case, and FIG. 15A illustrates a distorted shape when the projection apparatus of FIG. 14A is used, and FIG. 15B illustrates a distorted shape when the projection apparatus of FIG. 14B is used. Assuming the distorted shape as illustrated in FIGS. 15A and 15B, the parameter table is prepared to correct the distorted shape to be a rectangular shape. FIGS. 15A and 15B are one example of the deformation, and therefore the present embodiment is not limited to this. In the present embodiment, with respect to the projection field angle that is another parameter, more appropriate correction data is generated by an additional calculation based on parameter table data and field angle information. In the above configuration, when the type of the lens is changed, the parameter table needs to be replaced. Furthermore, since the parameter table can perform the exact correction at the lens shift position assumed for each lens, the lens shift position needs to be moved to a desired position (a reference position). Since it is preferred that the Keystone correction be performed again when the parameter table is replaced, the amount of the Keystone correction is tentatively returned to zero at the same time. This processing is performed in Step S305 of FIG. 3. Thus, the lens shift apparatus 112 moves the lens apparatus 104 (the lens unit 105) to the reference position so as to perform the Keystone correction of the projection image based on a predetermined parameter table.

The lens ID determination unit 108, the lens replacing determination unit 109, the lens ID storage unit 110, and the movement amount calculating unit 111 in FIG. 1 correspond to the system controller 213 and the storage unit 212 in FIG. 2.

Embodiment 2

Figure 11:
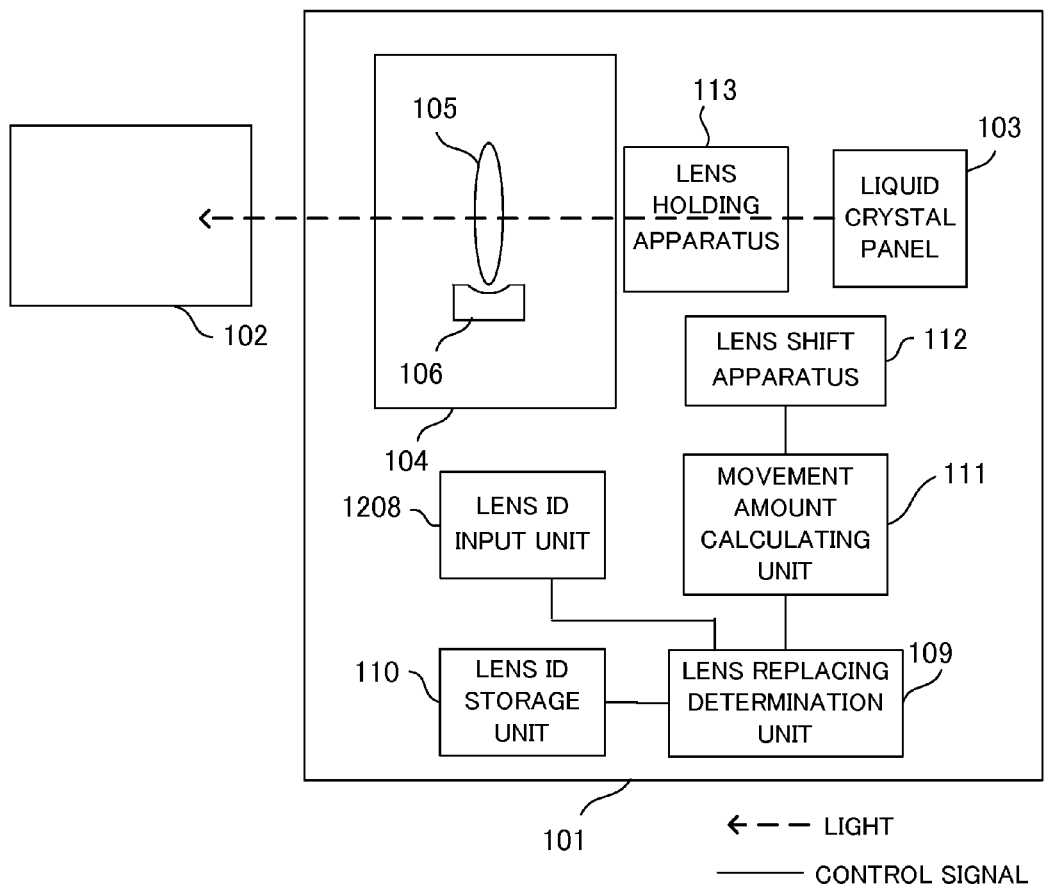
FIG. 11 is a configuration diagram of a main part of a projection apparatus in Embodiment 2.

Next, a projection apparatus in Embodiment 2 of the present invention will be described. FIG. 11 is a configuration diagram of a main part of the projection apparatus in the present embodiment. As illustrated in FIG. 11, in the projection apparatus of the present embodiment, a lens ID input unit 1208 (an operation input unit) is provided instead of the lens ID determination unit 108 of Embodiment 1. The method of automatically determining the lens ID is used in Embodiment 1, and on the other hand, a method of determining the lens ID based on the input of the lens ID (the lens information) by a user using the lens ID input unit 1208 is used in the present embodiment.

Figure 12:
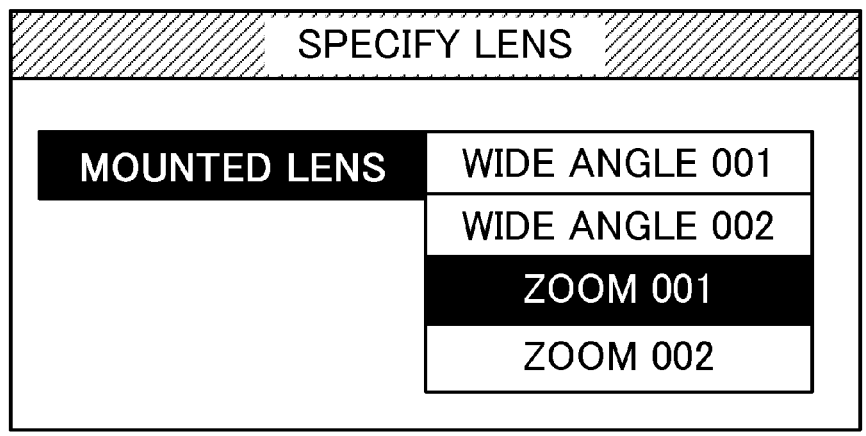
FIG. 12 is a schematic diagram of menu items that are displayed by a lens ID input unit in Embodiment 2.

The user can perform a menu-driven instruction input by the lens ID input unit 1208 provided on the projection apparatus 101 (the operation input unit 211 and the image overlaying circuit 208 of the projection apparatus 201). FIG. 12 is a schematic diagram of menu items that are displayed by the lens ID input unit 1208 in the present embodiment. The user selects the menu items as illustrated in FIG. 12 to specify the mounted lens apparatus. For example, in FIG. 12, the lens apparatus for which "ZOOM 001" is displayed is specified. After the lens apparatus is specified, the projection apparatus of the present embodiment performs a processing similar to that of Embodiment 1.

Figure 13:
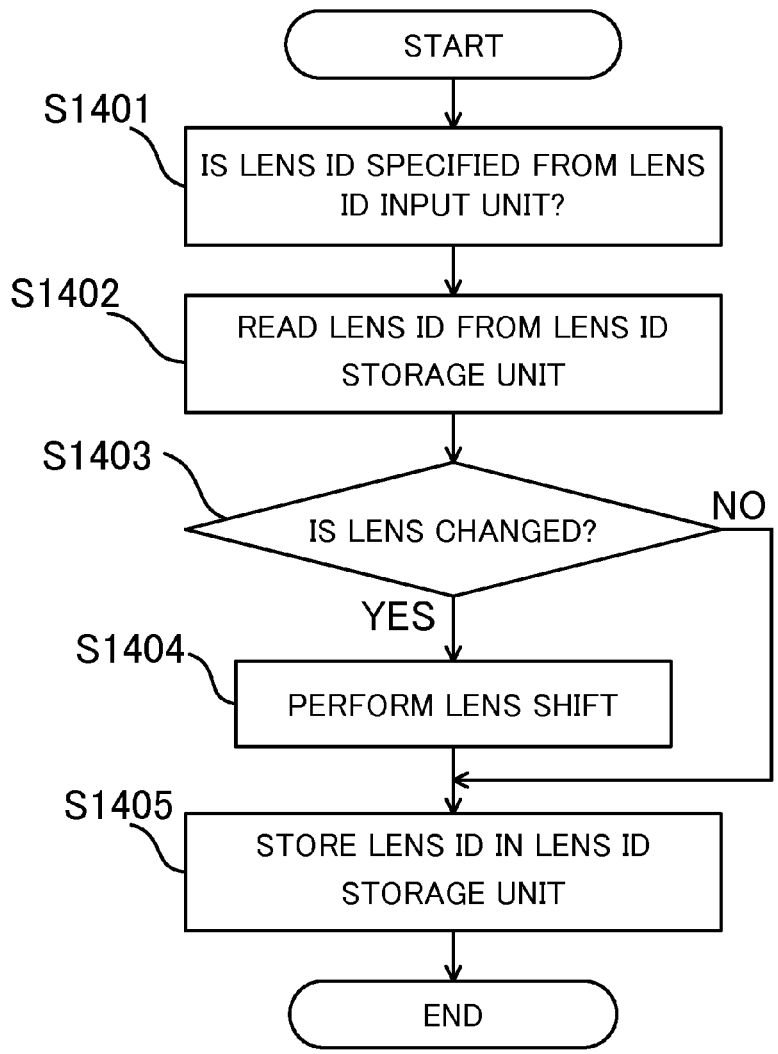
FIG. 13 is a flowchart of illustrating a processing procedure at the time of changing a lens in Embodiment 2.

In the present embodiment, it is preferred that a new lens ID be specified before changing the lens. Hereinafter, referring to FIG. 13, a flow of the processing to previously set the lens ID will be described. FIG. 13 is a flowchart of illustrating a processing procedure at the time of changing the lens of the present embodiment. First of all, in Step S1401, the user selects the menu item as illustrated in FIG. 12 using the lens ID input unit 1208 (FIG. 11) to specify the lens ID. This lens ID includes information by which the type of the lens can be determined. For example, the information is a model name or a part number of the lens, field angle information, an individual ID, a previously-added number, or the like.

Next, in Step S1402, the lens replacing determination unit 109 reads a previously-stored lens ID (a lens ID of a lens before the change) from the lens ID storage unit 110. The lens ID storage unit 110 stores the lens ID before the change (the current lens ID), including a case in which any lens is mounted. Subsequently, in Step S1403, the lens replacing determination unit 109 compares the lens ID specified by the lens ID input unit 1208 with the lens ID read from the ID storage unit 110 to determine whether or not the lens will be changed (whether or not the lens has been changed). When the lens ID is identical, the lens will not be changed (the lens has not been changed) and therefore the flow proceeds to Step S1405. In Step S1405, the lens ID storage unit 110 stores the lens ID. Since the lens ID does not change in this case, the storage operation of the lens ID does not have to be performed.

When the lens replacing determination unit 109 detects the change of the lens in Step S1403, the lens shift is performed in Step S1404. In this case, the movement amount calculating unit 111 defines the reference position and instructs a necessary movement amount to the lens shift apparatus 112, and the lens shift apparatus 112 moves the lens apparatus 104 (the lens unit 105) based on the instruction. In accordance with the relation of the size of the image circle, the movement amount calculating unit 111 may calculate the necessary movement amount to be zero. The lens ID input unit 1208, the lens replacing determination unit 109, the lens storage unit 110, and the movement amount calculating unit 111 in FIG. 11 correspond to the system controller 213, the storage unit 212, and the operation input unit 211 of FIG. 2.

The method of specifying the lens ID is described in Embodiments 1 and 2, but the change of the lens can be only detected and instructed without specifying the lens ID to be moved to a reference position in accordance with the lens apparatus (a reference position suitable for the lens apparatus). In Embodiments 1 and 2, the lens shift apparatus 112 is a mechanism that moves the lens apparatus 104, and the mechanism itself can also be provided inside the lens apparatus 104.

Embodiment 3

Next, a projection apparatus in Embodiment 3 of the present invention will be described. The projection apparatus of the present embodiment includes a unit that detects the change of the lens and moves a mounted lens to a reference position in accordance with the mounted lens (a reference position suitable for the mounted lens) when the change of the lens is detected, instead of comparing the lens IDs as described in Embodiment 1.

First of all, the lens ID determination unit 108 as a detector determines whether or not there is a terminal that is in a short state of the terminals of the lens ID device 107. When the terminal in the short state does not exist, the lens ID determination unit 108 determines that the lens is not mounted or the lens is removed. When the state of any terminal is changed to the short state from the state where no terminal in the short state exists, the lens ID determination unit 108 determines that the lens is mounted. Then, the lens shift apparatus 112 moves the mounted lens to the reference position calculated by the movement amount calculating unit 111 in accordance with the mounted lens.

In this case, if the movement amount calculating unit 111 can obtain the characteristics of the mounted lens, it calculates the reference position in accordance with the characteristics of the mounted lens. On the other hand, if the movement amount calculating unit 111 does not obtain the characteristics of the mounted lens, a reference position previously set to the projection apparatus is adopted.

In the present embodiment, the lens ID device 107 that has a short pin as a detector is used, but the present embodiment is not limited to this and a switch or a sensor may also be used. For example, when a switch that indicates an ON-state in a state where the lens is mounted and that indicates an OFF-state in a state where the lens is removed, the change of the switch from the OFF-state to the ON-state is detected to shift the mounted lens. As another example of the present embodiment, when a configuration in which a cover, a door, or the like is opened and closed in mounting and removing the lens is adopted, the lens shift apparatus 112 may move the mounted lens to the reference position by the detection of the opening or closing of the cover.

As another example, a configuration in which the drive of the lens shift apparatus 112 is detected or a configuration in which the movement of the lens apparatus 104 is detected can also be adopted to drive the lens shift apparatus 112 to determine the remove and the mount or the change of the lens, based on an operation resistance, an operation speed, a movement detection, or the like.

According to each of the above embodiments, a projection apparatus that moves amounted lens to a reference position in accordance with the mounted lens when a lens is changed can be provided.

On the other hand, when the switch of determining the mount of the lens changes from ON to OFF or the lens cover or the door opens, the movement of the lens holding apparatus 113 is possible. In this time, since there is also a case where the lens information of the lens that is to be subsequently mounted is unidentified, it may also be moved to a position where the projection apparatus 101 previously holds the lens, such as a shift position of vertically 50% and horizontally 0% or a shift position of vertically and horizontally 0% that is the most basic position. If the lens information of the lens that is to be subsequently mounted can be determined, the processing similar to that of Embodiment 2 is performed.

The flow represented by FIG. 3 or FIG. 13 may be performed by each hardware illustrated in FIG. 1, but the effect of the present invention can also be obtained even when each processing is performed by a processor such as a CPU in accordance with a program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-041179, filed on Feb. 28, 2011, and Japanese Patent Application No. 2011-272641, filed on Dec. 13, 2011, which are hereby incorporated by reference herein in their entirety.

What is claimed is:

1. A projection apparatus comprising:
   a lens shift unit configured to selectively move a lens mounted to the projection apparatus to a reference position;
   a lens information storage unit configured to store lens information prior to the lens being mounted to the projection apparatus; and
   a comparison unit configured to obtain lens information of the lens and to compare the lens information stored in the lens information storage unit with lens information of the lens,
   wherein the lens shift unit moves the lens to the reference position when the comparison unit determines that the lens information of the lens is different from the lens information stored in the lens information storage unit.

2. The projection apparatus according to claim 1, wherein the lens shift unit does not move the lens when the comparison unit determines that the lens information of the lens is identical to the lens information stored in the lens information storage unit.

3. The projection apparatus according to claim 1, wherein the lens shift unit moves the lens so that an optical axis of the mounted lens comes close to a normal that passes a center of a liquid crystal panel when image light is protruded from an image circle of the lens.

4. The projection apparatus according to claim 1, wherein the lens shift unit moves the lens to the reference position so as to perform a Keystone correction of a projection image based on a predetermined parameter table.

5. The projection apparatus according to claim 1, wherein the lens information of the lens is stored in a storage unit that is provided in the lens.

6. The projection apparatus according to claim 1, further comprising an operation input unit configured to input the lens information of the lens.

7. A non-transitory computer-readable storage medium that stores a program configured to be executed by a projection apparatus capable of changing a lens, the program comprising:
a lens shift step of selectively moving a lens mounted to the prolection apparatus to a reference position;
a storage step that stores lens information in a lens information storage unit prior to the lens being mounted to the projection apparatus; and
a comparison step that obtains lens information of the lens and compares the lens information stored in the lens information storage unit with lens information of the mounted lens,
wherein, in the lens shift step, the lens is moved to the reference position when the comparison step determines that the lens information of the lens is different from the lens information stored in the lens information storage.

8. The non-transitory computer-readable storage medium according to claim 7, wherein, in the lens shift step, the lens is not moved to the reference position when the comparison unit determines that the lens information of the lens is identical to the lens information stored in the lens information storage unit.

9. The projection apparatus according to claim 8, further comprising:
a lens information storage unit configured to store lens information,
wherein the determination unit is configured to obtain lens information of the mounted lens to compare the lens information stored in the lens information storage unit with the lens information of the mounted lens, and
wherein the lens shift unit moves the mounted lens to the reference position depending on the mounted lens in case that the lens information of the mounted lens is different from the lens information stored in the lens information storage unit when the determination unit determines that the mounted lens is changed.

10. The projection apparatus according to claim 9, wherein the lens shift unit does not move the mounted lens in case that the lens information of the mounted lens is identical to the lens information stored in the lens information storage unit when the determination unit determines that the mounted lens is changed.

11. The projection apparatus according to claim 8, wherein the lens shift unit moves the mounted lens to the reference position so that an optical axis of the mounted lens comes close to a normal that passes through a center of a liquid crystal panel when image light from the liquid crystal panel is protruded from an image circle of the mounted lens.

12. The projection apparatus according to claim 8, wherein the lens shift unit moves the mounted lens to the reference position so as to perform a Keystone correction of a projection image based on a predetermined parameter table.

13. The projection apparatus according to claim 9, wherein the lens information of the mounted lens is stored in a storage unit that is provided in the mounted lens.

14. The projection apparatus according to claim 9, wherein the lens information of the mounted lens is configured to be inputted from an operation input unit.

15. A projection apparatus capable of changing a lens, comprising:
a determination unit configured to determine whether a lens mounted on the projection apparatus has been changed; and
a lens shift unit configured to move the mounted lens to a reference position depending on lens information of the mounted lens when the determination unit determines that the mounted lens has been changed.

16. A non-transitory computer-readable storage medium that stores a program configured to be executed by a projection apparatus capable of changing a lens, the program comprising:
a determination step of determining whether a lens mounted on the projection apparatus has been changed; and
a lens shift step of moving the mounted lens to a reference position depending on lens information of the mounted lens when it is determined that the mounted lens has been changed as a result of the determination step.

17. The non-transitory computer-readable storage medium according to claim 16, the program further comprising:
a storage step of storing lens information in a lens information storage unit,
wherein, in the determination step, lens information of the mounted lens is obtained to compare the lens information stored in the lens information storage unit with the lens information of the mounted lens,
wherein, in the lens shift step, the mounted lens is moved to the reference position depending on the mounted lens in case that the lens information of the mounted lens is different from the lens information stored in the lens information storage unit when it is determined that the mounted lens is changed as a result of the determination step.

* * * * *